US012778154B2

(12) United States Patent
Duelund

(10) Patent No.: US 12,778,154 B2
(45) **Date of Patent: *Nov. 3, 2026**

(54) COMPOSITION FOR COATING CHEESE

(71) Applicant: Procudan A/S, Kolding (DK)

(72) Inventor: Maja Slyngborg Duelund, Kolding (DK)

(73) Assignee: Procudan A/S, Kolding (DK)

( * ) Notice: Subject to any disclaimer, the term of this patent is extended or adjusted under 35 U.S.C. 154(b) by 195 days.

This patent is subject to a terminal disclaimer.

(21) Appl. No.: 18/555,708

(22) PCT Filed: Apr. 22, 2022

(86) PCT No.: PCT/EP2022/060694

§ 371 (c)(1),
(2) Date: Oct. 16, 2023

(87) PCT Pub. No.: WO2022/223785

PCT Pub. Date: Oct. 27, 2022

(65) Prior Publication Data

US 2024/0196916 A1 Jun. 20, 2024

(30) Foreign Application Priority Data

Apr. 22, 2021 (EP) .................................... 21169850

(51) Int. Cl.
*A23C 19/16* (2006.01)

(52) U.S. Cl.
CPC .................................. *A23C 19/16* (2013.01)

(58) Field of Classification Search
CPC ........ A23P 20/11; A23C 19/16; A23C 19/163
See application file for complete search history.

(56) References Cited

U.S. PATENT DOCUMENTS

| | | | | |
|---|---|---|---|---|
| 2,077,301 | A | 4/1937 | Abrams et al. | |
| 2,256,764 | A | 9/1941 | Scott | |
| 2004/0146609 | A1 | 7/2004 | Nielsen et al. | |
| 2012/0064206 | A1 | 3/2012 | Pennarun | |
| 2021/0378974 | A1* | 12/2021 | Faget | A61K 47/44 |

FOREIGN PATENT DOCUMENTS

| | | | |
|---|---|---|---|
| EP | 0141299 | A2 | 5/1985 |
| EP | 0403030 | A1 | 12/1990 |
| FR | 1172719 | A | 2/1959 |
| GB | 194016 | | 3/1923 |
| WO | WO 2020/216719 | A1 | 10/2020 |

OTHER PUBLICATIONS

European Search Report for EP 21169850 dated Oct. 12, 2021.
International Search Report for PCT/EP2022/060694 dated Aug. 5, 2022.

(Continued)

*Primary Examiner* — Changqing Li
(74) *Attorney, Agent, or Firm* — Knobbe, Martens, Olson & Bear, LLP

(57) ABSTRACT

The present invention relates to a composition for coating cheese. In particular, the present invention relates to a composition for coating cheese comprising a high amount of beeswax, as well as emulsifier and in some embodiments a vegetable wax.

7 Claims, 1 Drawing Sheet

A)

B)

(56) References Cited

OTHER PUBLICATIONS

Aguirre-Joya, Jorge A. et al., "Edible Coatings and Films from Lipids, Waxes, and Resins" Edible Food Packaging, 2016, pp. 121-152.
Bourlieu, C. et al., "Edible Moisture Barriers for Food Product Stabilization" Edible Moisture Barriers, 2008, pp. 547-575.
Hasenhuettl, Gerard L. et al., "Food Emulsifiers and Their Applications" Second Edition, 2008.
Krog, Niels J. et al., "Food Emulsifiers: Their Chemical and Physical Properties" 2003.
Sayers, R. "Wax an introduction" European Wax Federation, 1983.
Danisco—Product Description—PD 591-16.5EN—Grindsted® ACTEM 70-00 P Kosher, Acetic Acid Tester, Material No. 052799, Sep. 28, 2007.
D10: Experimental Report.
Notice of Opposition to a European Patent issued in EP4079160 dated Jun. 27, 2024.

* cited by examiner

B)

D)

COMPOSITION FOR COATING CHEESE

CROSS REFERENCE TO RELATED APPLICATIONS

This application is a U.S. National Phase Application of PCT International Application Number PCT/EP2022/060694, filed on Apr. 22, 2022, designating the United States of America and published in the English language, which is an International Application of and claims the benefit of priority to European Patent Application No. 21169850.1, filed on Apr. 22, 2021. The disclosures of the above-referenced applications are hereby expressly incorporated by reference in their entireties.

TECHNICAL FIELD OF THE INVENTION

The present invention relates to a composition for coating cheese. In particular, the present invention relates to a composition for coating cheese comprising a high amount of beeswax, as well as emulsifier and in some embodiments a vegetable wax.

BACKGROUND OF THE INVENTION

Traditionally, compositions for coating cheese is made of paraffin and microcrystalline wax. Both paraffin and microcrystalline wax are petroleum based and hence such cheese coatings are based on same building blocks as plastics. Waxes of paraffin alone are also known, but those waxes are more brittle than the waxes based on a combination of paraffin and microcrystalline wax and have a tendency to crack. Microcrystalline wax is a refined mixture of solid, saturated aliphatic and branched hydrocarbons, and produced by de-oiling certain fractions from the petroleum refining process. Paraffin is a refined mixture of solid, saturated aliphatic hydrocarbons. Compositions for coating cheese based on mircrocrystalline wax and paraffin are strong and flexible such that they do not make cracks when stored on the cheese. Furthermore, they stays adhered to the cheese. Besides from being used in making cheese coatings, microcrystalline wax and paraffin are often used in industries for making tire and rubber, candles, adhesives, corrugated board, cosmetics, and castings.

However, there has been an increased demand for alternatives to petroleum based waxes. Hence, coating compositions for cheese that are free of petroleum based waxes, but made of bio-based ingredients, and having the same properties as petroleum based waxes, are sought for.

In EP 0 141 299 A2, a solution is disclosed where some of the wax of paraffin and microcrystalline cellulose is replaced with a coating layer of acetic acid esters of glycerides. EP 0 141 299 A2 discloses a method of coating hard cheese where cheese is first coated with a layer of a melt of one or more acetic acid ester of monoglycerides or fully hydrogenated or saturated edible fatty acids which are solid and waxy at room temperature, and then coating with a second layer of wax, the second layer being based on hydrocarbons. The second wax is disclosed to be consisting of a mixture of from 95 to 5% by weight of low melting microcrystalline waxes having a solidification point of 40 to 60° C. and 5 to 95% by weight plastic paraffines having a solidification ranging from 45 to 60° C. The coating with hydrocarbons (i.e. petroleum based waxes) in the second layer is necessary in order to protect the cheese against drying out and because of the low melting point of the first layer. However, hydrocarbons are wished avoided. Further, the use of acetic acid esters of monoglycerides alone as a coating is not suitable because of the low melting point. Therefore, using acetic acid esters of monoglycerides alone as a coating will provide a coating that is too soft.

In EP 0 403 030 A1 is a coating preparation described that is free of mineral hydrocarbon waxes. The coating preparation comprises A) wax-like fatty acid glyceryl esters which are solid at room temperature and B) waxes which are not of mineral origin. Component A) is in general acetylated monoglycerides/diglycerides of edible oils, preferably acetic acid esters of monoglycerides/diglycerides. Component B) is described to be a wax of vegetable or animal origin. EP 0 403 030 A1 further discloses that to improve the structure and obtain a better cohesion, adjust viscosity etc., it is possible to add polymer materials, such as plastics. The amount of acetylated mono/diglycerides in the coating preparation disclosed in EP 0403 030 A1 however is high, above 60%, and a composition for coating cheeses with such high amount of acetylated mono/diglycerides will be very soft. Further, such coating is prone to hydrolysis of the acetic acid moieties and there is a potential risk of oxidation of the fatty acid chains if based on unsaturated mono and diglycerides. This affects the shelf life of the cheese and reduces the possibility for use in coating of matured cheese products due to the coating lacking ability of protection the cheese from its surroundings. Acetylated mono and diglycerides are surface active compounds and will therefore tend to orientate in the interface with the hydrophobic moieties pointing towards the surroundings and the hydrophilic part pointing towards the cheese surface. This leads to a very sticky surface on the outside of the coating. A coating based on a high amount of acetylated mono/diglycerides will also result in an increased risk of microbial growth (mould) over time and hence a decreased storing time.

Beeswax is also known to be used as coating for cheeses, but when beeswax alone is used for coating of cheese, the wax becomes brittle when set and stored and may crack and pull away from the cheese due to lack of adhesion. Formation of cracks in the coating and coating that are pulled away from the cheese results in formation of mould, results in waterloss, change of cheese texture and will therefore lower the storage time of the cheese.

Hence, a composition for coating cheeses all based on bio-based materials, free of petroleum based waxes, and having the same properties as petroleum based waxes would be advantageous. In particular, a bio-based composition for coating cheese that are strong, flexible, has good adhesion to the cheese and do not form cracks or damages would be advantageous.

SUMMARY OF THE INVENTION

Thus, an object of the present invention is to provide a bio-based composition for coating cheese that solves the above mentioned problems of the prior art In particular, an object of the present invention relates to providing a composition for coating cheeses that are made of bio-based ingredients only, does not comprise any petroleum-based waxes, but are strong, flexible and has other of the good properties as petroleum-based waxes. In particular, it is an object to provide a composition for coating cheeses that are made of bio-based ingredients from vegetable or animal material that are not brittle, does not have the disadvantages of forming cracks or damages of the wax layer when stored, not being soft and having a low viscosity such that the coating layer of the composition is very thin. Further, it is an object to provide a bio-based composition for coating cheese that has a good adhesion to the cheese, is easily cut, solidifies quickly and gives a close surface on the cheese (for example, no microbial growth is formed on the coating), is stable against physical impact (for example can withstand handling of the cheese by handling equipment), has no visual colour migration, provides no off-taste to the cheese, and provides no odour when coated on the cheese.

It has surprisingly been found by the inventors of the present invention that a composition for coating cheese based on a high content of beeswax in combination with an emulsifier and in some embodiments a vegetable wax has properties similar to the petroleum-based waxes. For example, the composition for coating cheese according to the present invention is strong, flexible, does not form cracks, has a good adhesion to the cheese and solidifies quickly. Further, the composition for coating of cheese according to the invention is stable against physical impact, has no visual colour migration, provides no off-taste to the cheese, and the composition provides no odour to the cheese.

The inventors of the present invention have found that a composition for coating cheese based on waxes of animal and/or vegetable waxes alone are brittle and stiff and does therefore not have the elasticity and flexibility needed. Hence, coating compositions only made of animal and/or vegetable waxes are not suitable for coating cheese. However, the inventors of the present invention has also found that waxes of animal or vegetable material in high amounts and in combination with an emulsifier will lead to a composition for coating cheeses having the needed flexibility and softness similar to petroleum-based coating compositions. In particular, the inventors of the present invention have found a specific ratio between animal wax (beeswax), vegetable wax and emulsifier that results in a composition for coating cheese that have properties similar to petroleum-based waxes.

Thus, one aspect of the invention relates to a composition for coating cheese comprising beeswax, emulsifier, optionally vegetable wax, and (1) the composition comprises:
  i) beeswax in an amount of 70% to 90% by weight, and
  ii) emulsifier in an amount of 5% to 20% by weight, wherein the emulsifier is selected from the group consisting of acetic acid esters of glycerides, lactic acid esters of glycerides, diacetyl tartaric acid ester of glycerides, esters of sorbitans and combinations thereof, and
  iii) vegetable wax in an amount of 5% to 25% by weight, or
(2) the composition comprises: (2)
  i) beeswax in an amount of 85% to 90% by weight;
  ii) emulsifier in an amount of 10% to 15% by weight, wherein the emulsifier is selected from the group consisting of acetic acid esters of glycerides, lactic acid esters of glycerides, diacetyl tartaric acid esters of glycerides, esters of sorbitans and combinations thereof.

Another aspect of the present invention relates to a cheese coated with the composition according to the invention.

BRIEF DESCRIPTION OF THE FIGURES

FIG. 1A shows the break of a plate made of a coating composition evaluated as "preferred" while FIG. 1B shows the break of a plate made of a coating composition evaluated as "not useful".

Figure 1:
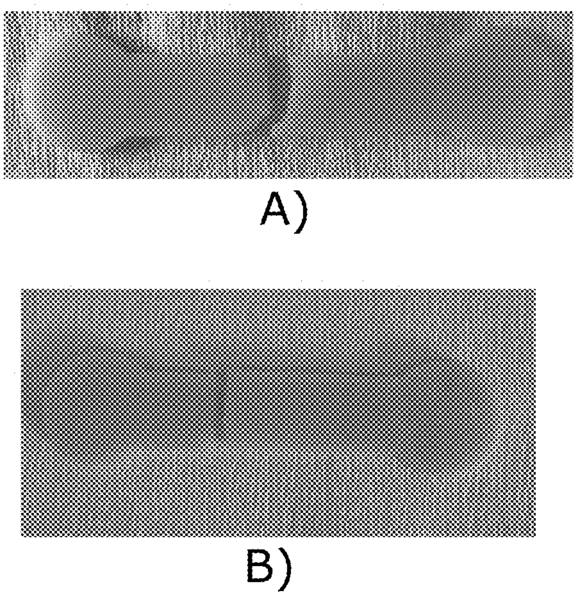
FIGS. 1A and 1B show pictures of the break of plates made of different coating compositions.

The present invention will now be described in more detail in the following.

DETAILED DESCRIPTION OF THE INVENTION

The use of beeswax for preparing coatings for cheese is known by the skilled person, but as mentioned earlier a coating completely made of beeswax is known to be brittle and may crack and pull away from the cheese. Various tests has been made in small dairies within the cheese industry to use beeswax as coating material without any success due to the lack of flexibility and therefore cracking. However, the inventors of the present invention has surprisingly found that a high amount of beeswax can be used for preparing a composition for coating cheese, if the beeswax is in combination with a small amount of emulsifier and more preferably in combination with an emulsifier and a vegetable wax.

DEFINITIONS

Prior to discussing the present invention in further details, the following terms and conventions will first be defined:

All references to singular characteristics or limitations of the present invention shall include the corresponding plural characteristic or limitation, and vice versa, unless otherwise specified or clearly implied to the contrary by the context in which the reference is made.

All percentages referred to herein are percentages by weight unless otherwise stated. Also, the terms "by weight of dry matter" and "on dry matter basis" refer to the same concept and are used interchangeably. The term "w/w" as in for example 1% w/w refers to a composition comprising 1% by weight of a compound.

The term "and/or" used in the context of "X and/or Y" should be interpreted as "X", or "Y", or "X and Y".

The term "bio-based" as in bio-based composition for coating cheese refers to the composition being of organic ingredients that is biological degradable. The term "bio-based" exclude petroleum-based compositions.

Unless defined otherwise, all technical and scientific terms used herein have the same meaning as commonly understood by one of ordinary skill in the art.

The inventors of the present invention have surprisingly found a composition for coating cheese having a high content of beeswax without containing any petroleum based waxes, but maintaining the properties of coating compositions for cheese made of petroleum-based waxes.

A property of coatings for cheese that is considered good is good flexibility, such that the coating can be bend without breaking. This enables the cheese to "move" thoughout the maturation time due to the biological organisms in the cheese resulting in rearrangement of the chemical components in the cheese (degradation of milk proteins). Further properties of the coating for cheeses that are important is the coating effect, solidification time, tensile strength, oxygen transmission rate (OTR), water vapor transmission rate (WVTR), viscosity, penetration and congealing point.

Coating Effect:

The coating effect describes the suitability of the coating composition is to be applied to the cheese. It is important that the coating is applied to the cheese in a layer thick enough to protect the cheese, but also in a layer thin enough to minimize packaging material and to be partly invisible.

The thickness of the coating layer should also not give any issues during transport of the cheese on conveyor belts and/or by equipment for handling the cheeses, such as packaging robots. A good coating effect is obtained when the coating is flexible and therefore not cracking, when the coating has enough strength to withstand the pressure from inside the cheese biological organisms and therefore keep the shape of the cheese, when the coating is properly adhered to the cheese surface and therefore no space is made for an airpocket layer which can cause unwanted microbiological growth conditions.

Flexibility:

The flexibility describes how flexible the coating composition is, i.e. the ability of the coating to be bend and turned without breaking. The coating should be able to be bend 180 degrees and turned 90 degrees without breaking. This also allows robot handling of the cheese after coating.

Solidification Time:

The solidification time of a composition for coating cheese is also important, since a too long solidification time will decrease production time during the cheese making production. The coating composition should be able to solidify within 15 seconds, and preferably faster. The solidification time should therefore be maximum up to 15 seconds, such as from 1 to 15 seconds. Preferably, the solidification time should be from 1 to 10 seconds and most preferably from 1 to 5 seconds.

Tensile Strength:

Tensile strength is a measurement of the maximum recorded force per $cm^2$ that can be applied to a sample of coating composition before the sample breaks.

Water vapor transmission rate (WVTR): WVTR describes the permeability of water/moisture through the coating material.

A good composition for coating has a low WVTR, such as a WVTR of maximum 150 g·mm/$m^2$·day. It is undesired that moisture from surroundings enters the cheese coating and hence is able to amend the texture of the cheese. Further, loss of moisture from the cheese should be avoided since it will make the cheese more expensive and provide alterations in the texture.

Compositions for coating cheese having a WVTR of 150 g·mm/$m^2$ day or less is acceptable. However, a WVTR of less than 50 g·mm/$m^2$·day is preferred, such as a WVTR of 2-50 g·mm/$m^2$·day.

Oxygen Transmission Rate (OTR):

OTR describes the permeability of oxygen over the coating material. A good composition for coating has a low OTR, such as a maximum OTR of 4500 ml/$m^2$/day/atm. An OTR below 2000 ml/$m^2$/day/atm is however preferred.

Viscosity:

By viscosity is meant the viscosity of the composition for coating cheese. The composition for coating cheese should have a viscosity in the range of 2 to 30 mPa·s for obtaining a good coating. Preferably, the viscosity should be in the range of from 5 to 20 mPa·s.

Penetration:

The penetration of a composition for coating cheese is a measurement of the hardness of the coating composition.

The penetration is measured as decimillimeter (dmm) and should be in the range of 10 to 75 dmm. Preferably, the penetration should be in the range of 15 to 50 dmm.

Congealing Point:

The congealing point is a property of compositions for coating cheese that relates to when the coating composition begins to solidify.

By measuring the congealing point, the temperature at which a sample being cooled develops a “set” or is resistance to flow is measured. At that temperature, the coating composition may be at or close to the solid state, or it may be semisolid and quite unctuous, depending on the coating composition being tested. The congealing point should be in the range of from 45° C. to 75° C. Preferably, the congealing point should be in the range of from 55° C. to 75° C.

One aspect of the invention relates to a composition for coating cheese comprising beeswax, emulsifier, optionally vegetable wax, and (1) the composition comprises:
- i) beeswax in an amount of 70% to 90% by weight, and
- ii) emulsifier in an amount of 5% to 20% by weight, wherein the emulsifier is selected from the group consisting of acetic acid esters of glycerides, lactic acid esters of glycerides, diacetyl tartaric acid ester of glycerides, esters of sorbitans and combinations thereof, and
- iii) vegetable wax in an amount of 5% to 25% by weight, or (2) the composition comprises:
- i) beeswax in an amount of 85% to 90% by weight;
- ii) emulsifier in an amount of 10% to 15% by weight, wherein the emulsifier is selected from the group consisting of acetic acid esters of glycerides, lactic acid esters of glycerides, diacetyl tartaric acid esters of glycerides, esters of sorbitans and combinations thereof.

The composition for coating cheese according to alternative (1) and (2) results in good or at least acceptable properties with regards to flexibility, coating effect, solidification time, tensile strength, oxygen transmission rate OTR), water vapor transmission rate (WVTR), viscosity, penetration and congealing point.

Alternative (1):

The inventors of the present invention have found out that a combination of beeswax (more than 70% by weight), a vegetable wax and an emulsifier results in a coating composition considered good or at least acceptable in relation to the above mentioned parameters.

Beeswax:

The amount of beeswax in the composition is in an aspect of the invention in the range of from 70% to 90% by weight.

Preferably, the beeswax is present in the composition for coating cheese according to alternative (1) in an amount of 75% to 90% by weight and most preferably the amount of beeswax is in the range of 80 to 90% by weight.

Vegetable Wax:

The amount of vegetable wax in the composition is in an aspect of the invention in the range of 5% to 25% by weight. Preferably, the vegetable wax is present in the composition in an amount of 5% to 20% by weight, most preferably 5% to 15% by weight. The vegetable wax may also be present in an amount of 10% to 15% by weight.

The vegetable wax is in an embodiment of the invention one or more selected from the group consisting of Candelilla wax, Carnauba wax, Rice bran wax, Coconut wax, Palm-based wax, Soy-based wax, and Rapeseed-based wax.

By the term “Palm-based” is in the context of the present invention meant a wax based on a palm product, such as palm wax and palm kernel wax.

By the term “Soy-based wax” is in the context of the present invention meant a wax based on a soy product or derivates hereof.

By the term “Rapeseed-based” is in the context of the present invention meant a wax based on a rapeseed product, such as rapeseed wax and either low or high eruca acid containing wax.

In a more preferred embodiment of the present invention, the vegetable wax is one or more selected from the group consisting of Candelilla wax, Coconut wax, Palm-based wax, Soy-based wax and rapeseed-based wax. In an even further preferred embodiment of the invention, the vegetable wax is selected from the group consisting of Candelilla wax, Coconut wax, Palm-based wax and Soy-based wax.

The vegetable wax is most preferably Candelilla wax.

Emulsifier:

In another aspect of the invention, the emulsifier is present in the composition in an amount of 5% to 20% by weight. More preferably, the emulsifier is present in the composition in an amount of 5 to 15% by weight.

The emulsifier is in an aspect of the invention selected from the group consisting of acetic acid esters of glycerides, lactic acid esters of glycerides, diacetyl tartaric esters of glycerides, esters of sorbitans, and combinations thereof.

In principle, the acetic acid esters may be any ester of a glyceride and the invention should not be limited to the type of glyceride being esterified with the acetic acid. However, preferably the acetic acid ester is an ester of monoglycerides, diglycerides or a combination thereof. More preferably, the acetic acid ester is an acetic acid ester of monoglycerides.

The lactic acid esters of glycerides may also be an ester of any glyceride, i.e. lactic acid esters of monoglycerides, diglycerides or a combination thereof. However, in a preferred embodiment of the present invention, the lactic acid esters of glycerides are lactic acid esters of mono-diglycerides.

The diacetyl tartaric esters of glycerides may also be an ester of any glyceride, i.e. diacetyl tartaric esters of monoglycerides, diglycerides or a combination thereof. However, in a preferred embodiment of the present invention, the diacetyl tartaric esters of glycerides are diacetyl tartaric esters of mono-diglycerides.

The esters of sorbitan may be any ester of a sorbitan, such as unsaturated sorbitan esters and saturated sorbitan esters. In some embodiments of the present invention, the esters of sorbitan are saturated sorbitan esters selected from the group consisting of sorbitan tristearate and sorbitan monolaurate. In other embodiments of the present invention, the esters of sorbitan are unsaturated sorbitan esters selected from the group consisting of sorbitan monooleate and sorbitan trioleate.

Preferably, the emulsifier is selected from the group consisting of acetic acid esters of monoglycerides, lactic acid esters of mono-diglycerides, diacetyl tartaric ester of mono-diglycerides, esters of sorbitans and combinations thereof.

The emulsifier is in a most preferred embodiment of the present invention an acetic acid ester of monoglycerides from palm oil. However, especially a diacetyl tartaric ester of mono-diglycerides from rapeseed and/or palm based oils and esters of sorbitans is also useful.

In an embodiment of the present invention, the ratio between the vegetable wax and the emulsifier is in the range of 1:5 to 5:1, preferably in the range of 1:3 to 3:1.

Alternative (2)

The inventors of the present invention have most surprisingly also found that in particular embodiments of the present invention it was not necessary to add any vegetable wax. However, to obtain a composition for coating cheese without vegetable wax and the wax fulfilled the acceptable parameters of flexibility, coating effect, solidification time, tensile strength, oxygen transmission rate (OTR), water vapor transmission rate (WVTR), viscosity, penetration and congealing point, it was necessary to have a very high amount of beeswax. Hence, in an aspect of the invention, the composition for coating cheese (2) comprises:

i) beeswax in an amount of 85% to 90% by weight;
ii) emulsifier in an amount of 10% to 15% by weight, wherein the emulsifier is selected from the group consisting of acetic acid esters of glycerides, lactic acid esters of glycerides, diacetyl tartaric esters of glycerides, esters of sorbitans and combinations thereof.

In an embodiment of the invention, the composition for coating cheese according to alternative (2) may also comprise a vegetable wax.

The vegetable wax, if present, is present in the composition in an amount of up to 5% by weight, such as from 0 to 5% by weight, preferably from 0.5 to 5% by weight.

The vegetable wax is in an embodiment of the invention one or more selected from the group consisting of Candelilla wax, Canauba wax, Rice bran wax, Coconut wax, Palm-based wax, Soy-based wax and Rapeseed-based wax.

In a more preferred embodiment of the present invention, the vegetable wax is one or more selected from the group consisting of Candelilla wax, Coconut wax, Palm-based wax, Soy-based wax and Rapeseed-based wax. In an even further preferred embodiment of the invention, the vegetable wax is selected from the group consisting of Candelilla wax, Coconut wax, Palm-based wax and soy-based wax.

The vegetable wax is most preferably Candelilla wax.

The acetic acid esters of glycerides may be any ester of a glyceride and the invention should not be limited to the type of glyceride being esterified with the acetic acid. However, preferably the acetic acid ester is an ester of monoglycerides, diglycerides or a combination thereof. More preferably, the acetic acid ester is an acetic acid ester of monoglycerides.

The lactic acid esters of glycerides may also be an ester of any glyceride, i.e. lactic acid esters of monoglycerides, diglycerides or a combination thereof. However, in a preferred embodiment of the present invention, the lactic acid esters of glycerides are lactic acid esters of mono-diglycerides.

The diacetyl tartaric esters of glycerides may also be an ester of any glyceride, i.e. diacetyl tartaric esters of monoglycerides, diglycerides or a combination thereof. However, in a preferred embodiment of the present invention, the diacetyl tartaric esters of glycerides are diacetyl tartaric esters of mono-diglycerides.

The esters of sorbitan may also be any ester of a sorbitan. However, as earlier disclosed, the ester of sorbitan may be selected from the group consisting of unsaturated sorbitan esters and saturated sorbitan esters.

Further Embodiments of the Composition for Coating Cheese:

In a preferred embodiment of the composition for coating cheese according to the present invention, the composition does not comprise any petroleum-based waxes. For example, the composition according to the present invention does not comprise any paraffin-based waxes or any microcrystalline waxes.

However, other ingredients typically used in a composition for coating cheese may also be present in the composition of the present invention. This could for example be coloring agents. The coloring agent may for example be coated on a food grade carrier like an sorbitanester.

The present invention also relates to a cheese coated with the composition according to the present invention.

It should be noted that embodiments and features described in the context of one of the aspects of the present invention also apply to the other aspects of the invention.

The invention will now be described in further details in the following non-limiting examples.

EXAMPLES

Example 1: Methods

Example 1.1: Method of Measuring Coating Effect

A sample of the different compositions for coating cheese was heated to 90° C. and kept at this temperature during the testing. Blocks of hard yellow cheese was prepared. The blocks were 8 cm in length and had a cross-section of 9 $cm^2$. These cheese blocks are dipped in the different samples of coating compositions for 5 seconds to be coated with a layer of the coating composition. This may be repeated to provide a second layer of the coating composition on the cheese. The second layer is added when the coating adhere sufficiently to the cheese and is without cracks. The coating was evaluated after both a first layer and a second layer of coating. After storing for three days in 5-8° C., the coated cheese blocks was evaluated as either good, bad or not useful, depending on the visual coating layer and the adhesion of wax to the cheese.

Evaluated good: The cheese block is uniformed coated, no visible cracks, no craking occuring when handled manually, and the coating is not changing during storage in refridgerator upto at least 3 weeks.

Evaluated poor: The cheese block is looking uniformly coated but with thin layer of coating on the sharp edges (a thick layer is needed to avoid cracks on the sharp edges), and cracking can occur when manually handled.

Evaluated not useful: The coating on the cheese block is not uniform, either very thin layer on all cheese sides and/or thick layer on part of the cheese sides. The coating is broken or split either instantly or after a few days in a refridgerator giving directly contact to the cheese and resulting in that the cheese is not protected.

Example 1.2: Method of Measuring Flexibility

A sample of the different compositions for coating cheese was formed and moulded into a rectangular plate with semi-circular pieces. The length of the rectangular plate was 5 cm long and in the cross-sectional area is 0.42 $cm^2$. The flexibility of the plates were tested by bending the plates. Flexibility of the plates were evaluated as "yes" or "no". If the plates at room temperature, 23° C., can be bended 180 degrees and turned at least 90 degrees without breaking, the wax was evaluated as a "yes" for flexibility.

Example 1.3: Method of Measuring Solidification Time

A 100 ml round-bottomed glass flask filled with rapeseed oil was kept at 23° C. and 50% relative humidity (RH). The glass flask was immersed for 5 seconds in a melted sample of coating composition, melted at 90° C. The solidification time was determined as the time in seconds that elapsed between removal of the round-bottomed glass flask from the "bath" of melted coating composition and the time when a fingerprint was no longer visible on the coating when the solidified coating composition was touched at a point 45 degrees from the bottom of the round-bottomed flask.

Samples of coating composition that took more than 15 seconds to solidify, was considered too long time to solidify and hence not useful.

Example 1.4: Method of Measuring Tensile Strength

Samples of different compositions for coating cheese was formed and moulded by hot compression molding into a rectangular plate with semi-circular end pieces.

The length of the rectangular plate is 9 cm, the width is 1.5 cm and the thickness is 0.3 cm.

After storage at 23° C. and 50% relative humidity (RH), the samples were tested in a tensile tester, ESM303 from MARK-10, by attaching the ends of the samples to the grips of the equipment/apparatus. The samples were stretched in the apparatus with a constant rate of 50 mm/min. When measuring the tensile strength, the grips used are G1061 from MARK-10.

The tensile strength is the maximum recorded force per cross-sectional area ($cm^2$) before the sample breaks.

In FIGS. 1A and 1B are samples of a preferred coating composition (FIG. 1A) and a not useful coating composition (FIG. 1B) shown.

The plate made of the preferred coating composition (FIG. 1A) has an uneven break which is the result of a non-brittle coating composition that is more elastic and flexible. On the contrary, the plate made of the coating composition that is not useful shows a very clear cut break. This is characteristic for very brittle coating compositions, since the components in the coating composition are not elastic or flexible.

Example 1.5: Method of Measuring Water Vapor Transmission Rate (WVTR)

WVTR describes the permeability of the coating material and the used method are a modified version of ASTM E96. The principles of the technique is the utilization of the physical laws about every organic conditions are trying to reach equilibrium and in this specific analysis the sample was placed in a testing cell with very low moisture content and the testing cell was placed in a cabinet with constant humidity and temperature. The equilibrium is then trying to occur by the internal of the testing cell absorbing moisture through the membrane of the coating composition. The less water vapor permeability, the less water can pass through the membrane of the coating composition and less weight uptake will be observed during measurement of the testing cells.

Samples of coating composition were prepared with a specific thickness and diameter corresponding to the surface of the testing cells. The weight of the coating membrane was noted and used in the permeability calculation after testing was performed. Afterwards, a given amount of a chemical moisture absorber was weighted into the testing cell and after the coating membrane were added to the testing cell as a lid, the mass of the total testing cell was noted. The testing cell was kept at a desired humidity (50% RH) and temperature (23° C.) and was weighted with a specific interval of days. After the testing cell was weighted at least 8 times, the permeability was calculated to be $g \cdot mm/m^2 \cdot day$.

Example 1.6: Method of Measuring Oxygen Transmission Rate (OTR)

OTR, as WVTR, describes the permeability of the composition for coating cheese.

Samples of compositions for coating cheese was prepared similarly to the samples used for the WVTR analysis.

Test cells of stainless steel were prepared as a container with an open circular lid where into the coating composition was mounted. Further, the container was equipped with a gas inlet at the bottom and a gas outlet near the lid in the top of the container. This inlet and outlet were closed with a septum to keep the container closed during testing. The lid was fasted to the container comprising the sample of coating composition and afterwards the oxygen atmosphere is displaced by flushing the container with nitrogen. After storage for at least 72 hours at 23° C. and 50% relative humidity, the oxygen residue inside the container is measured with a gas detector through the gas inlet. The oxygen permeability was then calculated based on several parameters like the headspace volume, gas composition at start, atmosphere outside the packaging, storage conditions and time.

The OTR is calculated as ml/m$^2$/day/atm.

The term "atm" refers to atmosphere.

Example 1.7: Method of Measuring Viscosity

Viscosity is measured by using the Standard Test Method for Apparent Viscosity of Hot Melt Adhesives and Coating Materials, ASTM D3236.

Example 1.8: Method of Measuring Penetration

Penetration is measured by using the Standard Test Method for Needle Penetration of waxes, ASTM D1321.

Example 1.9: Congealing Point

The congealing point is measured by using the Standard Test Method for Congealing Point of waxes, ASTM D938

Example 2: Analysing Different Compositions Comprising Beeswax, Vegetable Wax and Emulsifier Different samples of coating compositions was made comprising the amounts of beeswax, Candelilla wax (as vegetable wax) and acetic acid ester of monoglycerides (as emulsifier) shown in table 1.

The different samples was analysed with respect to congealing point, penetration, viscosity, WVTR, OTR, tensile strength, flexibility, solidification time, and coating effect.

Candelilla wax from Novevo GmbH was used as the vegetable wax.

As emulsifier was acetic acid ester of monoglycerides used, GRINDSTED® Acetem 70-00 P.

A beeswax from Novero GmbH was used.

TABLE 1

| | Beeswax | Candelilla wax | Acetem 70 | Acceptance level |
|---|---|---|---|---|
| Sample 1 | 90 | 10 | | Poor |
| Sample 2 | 90 | | 10 | Acceptable |
| Sample 3 | 90 | 5 | 5 | Preferred |
| Sample 4 | 85 | 15 | | Not useful |
| Sample 5 | 85 | | 15 | Acceptable |
| Sample 6 | 80 | | 20 | Poor |
| Sample 7 | 100 | | | Poor |
| Sample 8 | | | 100 | Not useful |

The evaluation "Poor", "acceptable", Preferred" and "Not useful" is based on analyses of congealing point, penetration, viscosity, WVTR, OTR, tensile stength, flexibility, solidification time, and coating effect as shown in table 2.

Further, FIG. 2A-D shows pictures of cheeses with different coating compositions where the coating compositions were evaluated as either "not useful", "poor", "acceptable" and "preferred".

Figure 2:
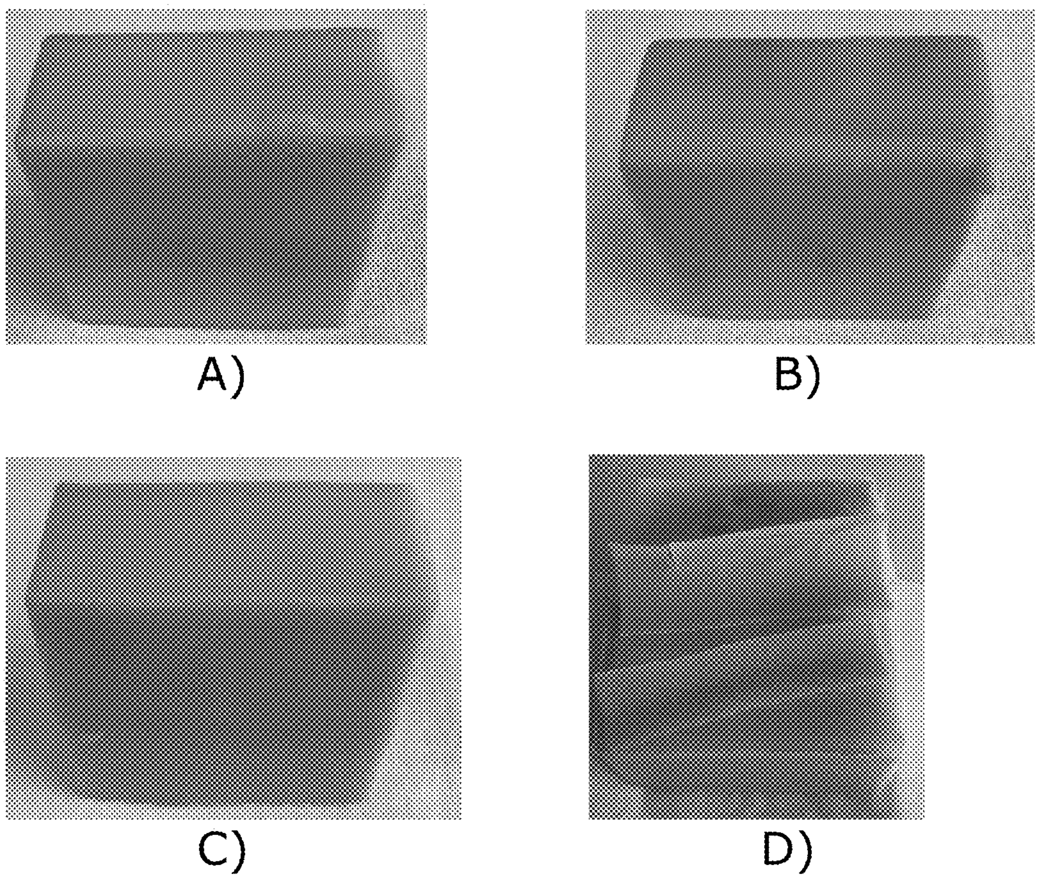
FIG. 2A-D shows pictures of different cheeses coated with different coating compositions.

FIG. 2A shows a cheese with a coating composition evaluated as "preferred". The coating composition evaluated as "preferred" has a good adhesion between the cheese and the coating composition and has no obvious beginnings of cracks on the coating layer on the sides or edges of the cheese.

FIG. 2B shows a cheese with a coating composition evaluated as "acceptable". The coating composition evaluated as "acceptable" has a good adhesion between the cheese and the coating composition and has only a slightly risk of cracks on the edges of the cheese. These risk of cracks can be avoided by changing the application temperature and hence the viscosity which will give a thicker coatinglayer on the edges of the cheese.

FIG. 2C shows a cheese with a coating composition evaluated as "poor". The coating composition evaluated as "poor" has visual cracks (or almost cracks) on the surface on the cheese, for example at the edges of the cheese.

FIG. 2D shows a cheese with a coating composition evaluated as "not useful". The coating composition evaluated as "not useful" has no adhesion between the cheese and coating composition despite amending the application temperature.

TABLE 2

| Sample No. | 1 | 2 | 3 | 4 | 5 | 6 | 7 | 8 |
|---|---|---|---|---|---|---|---|---|
| Congealing point (° C.) | 64 | 64 | 63.5 | 62.5 | 68 | 62.5 | 64 | 36.3 |
| Penetration (dmm) | 16.6 | 29.4 | 24.9 | 25.7 | 15.7 | 34.9 | 18.5 | 112.2 |
| Viscosity (mPa · s) | 11.1 | 8.8 | 10.3 | 10.9 | 11.76 | 10.16 | 9.8 | 5.25 |
| WVTR (g · mm/m$^2$ · day) | 12.9 | 8.2 | 6.3 | 23.2 | 17.2 | 22 | 6.2 | 12.8 |
| OTR (ml/m$^2$/day/atm) | 210 | 72 | 302 | N/A | N/A | N/A | 137 | 1100 |
| Tensile strength (MPa) | 1.92 | 1.00 | 1.72 | 2.23 | 1.32 | 0.99 | 1.5 | 0.07 |
| Flexibility (Yes/No) | Yes | Yes | Yes | No | Yes | Yes | No | Yes |
| Solidification time (sec) | 2 | 2.2 | 2.6 | 2.4 | 2.8 | 1.1 | 2.0 | >15 |
| Coating effect (visual) | Poor | Good | Good | Poor | Good | Poor | Poor | Poor |
| Overall acceptance | Poor | Good | Preferred | Not useful | Preferred | Poor | Poor | Not useful |

As shown in table 1 and 2, it was found that a composition comprising only Beeswax and only emulsifier was considered not suitable for coating cheese. Further, a combination of beeswax and vegetable wax (Candelilla wax) was considered poor or not useful for coating cheeses. However, compositions comprising beeswax in amounts of 85% and 90% by weight and acetic acid ester of monoglyceride in amounts of 15% and 10%, respectively, are considered to be acceptable for coating cheeses, while a composition comprising 80% by weight beeswax and 20% by weight acetic acid ester of monoglyceride is considered to be poor in coating cheeses. Hence, compositions comprising beeswax and emulsifier only are useful as coating for cheeses if the amount of beeswax is more than 85%.

Furthermore, it was as shown in table 1 and 2 that a composition comprising 90% by weight beeswax and 5% acetic acid ester of monoglyceride was considered "preferred" when also 10% Candelilla wax was present.

Example 3: Analysing Amount of Beeswax Necessary

An example was made to analyse how much beeswax was necessary in order to obtain a coating composition with desired coating properties, such as flexibility, solidification time and coating effect when also vegetable wax and emulsifier was present. Different samples of coating compositions was made comprising the amounts of beeswax, Candelilla wax (as vegetable wax) and acetic acid ester of monoglycerides (as emulsifier) shown in table 3. The different samples was analysed with respect to congealing point, penetration, viscosity, WVTR, OTR, tensile stength, flexibility, solidification time, and coating effect.

Candelilla wax from Novero GmbH was used as the vegetable wax.

Acid ester of monoglycerides used, GRINDSTED® Acetem 70-00 P was used as emulsifier.

A beeswax from Novero GmbH was used.

TABLE 3

| | Beeswax | Candelilla wax | Acetem 70 | Acceptance level |
|---|---|---|---|---|
| Sample 9 | 90 | 5 | 5 | Preferred |
| Sample 10 | 85 | 10 | 5 | Acceptable |
| Sample 11 | 85 | 5 | 10 | Preferred |

TABLE 3-continued

| | Beeswax | Candelilla wax | Acetem 70 | Acceptance level |
|---|---|---|---|---|
| Sample 12 | 80 | 15 | 5 | Acceptable |
| Sample 13 | 80 | 5 | 15 | Acceptable |
| Sample 14 | 80 | 10 | 10 | Acceptable |
| Sample 15 | 95 | 2.5 | 2.5 | Not useful |
| Sample 16 | 70 | 20 | 10 | Preferred |
| Sample 17 | 40 | 10 | 50 | Not useful |
| Sample 18 | 60 | 10 | 30 | Not useful |

Hence, it can be concluded that a composition comprising from 70 to 90% by weight beeswax is good or at least acceptable for coating cheeses when the beeswax is in combination with a vegetable wax and an emulsifier. Further, it is shown that the amount of vegetable wax may be in the range of 5% to 20% by weight.

The evaluation "Preferred", "Acceptable", Poor" and "Not useful" is based on analyses of congealing point, penetration, viscosity, WVTR, OTR, tensile stength, flexibility, solidification time, and coating effect as shown in table 4.

TABLE 4

| Sample No. | 9 | 10 | 11 | 12 | 13 | 14 | 15 | 16 | 17 | 18 |
|---|---|---|---|---|---|---|---|---|---|---|
| Congealing point (° C.) | 63.5 | 64.5 | 64 | 62.5 | 62 | 62.5 | 64.8 | 63 | 60.8 | 63 |
| Penetration (dmm) | 24.9 | 23.4 | 26.3 | 21 | 28.4 | 24.5 | 24.1 | 26 | 45.6 | 33.1 |
| Viscosity (mPa · s) | 10.3 | 9.9 | 9.6 | 10.6 | 9.82 | 10.4 | 9.78 | 10.5 | 8.1 | 9.9 |
| WVTR (g · mm/m$^2$ · day) | 6.3 | 6.4 | 9.9 | 8.6 | 9.3 | 11.8 | 19.3 | N/A | 5.7 | N/A |
| OTR (ml/m$^2$/day/atm) | 302 | 125 | 87 | 21 | N/A | N/A | N/A | N/A | N/A | N/A |
| Tensile strength (MPa) | 1.72 | 1.64 | 1.44 | 1.87 | 1.19 | 1.72 | 1.66 | 1.49 | 1.15 | 1.34 |
| Flexibility (Yes/No) | Yes | No | Yes | Yes | Yes | No | Yes | Yes | No | Yes |
| Solidification time (sec) | 2.6 | 2.8 | 2.4 | 2.8 | 2.0 | 1.6 | 1.6 | 2.7 | 1.6 | 2.7 |
| Coating effect (visual) | Good | Acceptable | Good | Acceptable | Acceptable | Acceptable | Not useful | Good | Not useful | Poor |
| Overall acceptance | Preferred | Acceptable | preffered | Acceptable | Acceptable | Acceptable | Not useful | Preferred | Not useful | Not useful |

Example 4: Analysing Different Emulsifiers

An example was prepared to analyse the use of different emulsifiers.

The emulsifiers tested were:

Acetic acid ester of monoglycerides from palm oil, GRINDSTED® Acetem 70-00 P from Dupont.

Lactic acid ester mono and diglycerides (LACTEM), GRINDSTED® LACTEM from Dupont.

Monoglyceride from fully hydrogenated rapeseed oil, DIMODAN® HR from DuPont.

Diacetyl tartaric acid ester of mono-diglycerides (DATEM) from fully hydrogenated rapeseed and/or palm based oils, PANODAN® A2020 from Dupont.

Soy Lecithin, SOLEC™ B-10 from DuPont.

Polysorbate 60, Tween 60 MBAL-LQ-(MV) from Croda (Polyoxyethylene sorbitan fatty acid ester).

Sorbitan monolaurate (SML), Span 20-LQ-(MV) from Croda.

Sorbitan tristearate (STS), Span 65 MBAL-PW-(MV) from Croda.

Polyglycerol polyricinoleate (PGPR), Palsgaard® PGPR 4175 from Palsgaard.

All samples was made with 85% by weight beeswax and 5% by weight Candelilla wax and 10% by weight emulsifier where the type of emulsifier varied. The result is shown in table 5.

TABLE 5

| Type of emulsifier | Acceptance level |
|---|---|
| Acetic acid ester of monoglyceride, ACETEM 70 | Preferred |
| Lactic acid ester mono and diglycerides, LACTEM | Acceptable |
| Monoglyceride, DIMODAN | Poor |
| Diacetyl tartaric acid ester of mono-diglycerides, DATEM | Acceptable |
| Lecithin | Poor |
| Polysorbate 60, P60 | Poor |
| Sorbitan monolaurate, SML | Acceptable |
| Sorbitan Tristearate, STS | Acceptable |
| PGPR | Poor |

The evaluation "Preferred", "Acceptable", and Poor" is based on analyses of congealing point, penetration, viscosity, WVTR, OTR, tensile stength, flexibility, solidification time, and coating effect as shown in table 6.

TABLE 6

| Emulsifier | ACETEM 70 | LACTEM | DIMODAN | DATEM | Lecithin | P60 | SML | STS | PGPR |
|---|---|---|---|---|---|---|---|---|---|
| Congealing point (° C.) | 64 | 64.3 | N/A | 63.5 | N/A | N/A | N/A | 65 | N/A |
| Penetration (dmm) | 26.3 | 22.8 | N/A | 19.8 | N/A | N/A | N/A | 30.2 | N/A |
| Viscosity (mPa · s) | 9.6 | 10.53 | N/A | 11.67 | N/A | N/A | N/A | 11.21 | N/A |
| WVTR (g · mm/m$^2$ · day) | 9.9 | N/A | N/A | N/A | N/A | N/A | N/A | N/A | N/A |
| OTR (ml/m$^2$/day/atm) | 87 | N/A | N/A | N/A | N/A | N/A | N/A | N/A | N/A |
| Tensile strength (MPa) | 0.99 | 0.61 | N/A | 1.11 | N/A | N/A | N/A | 0.39 | N/A |
| Flexibility (Yes/No) | Yes | Yes | N/A | Yes | N/A | N/A | N/A | No | N/A |
| Solidification time (sec) | 2.4 | 1.7 | 3.3 | 2.6 | 2.2 | 1.5 | 2 | 1.6 | 2.1 |
| Coating effect (visual) | Good | Acceptable | Acceptable | Acceptable | Poor | Poor | Good | Acceptable | Poor |
| Overall acceptance | Preferred | Acceptable | Poor | Acceptable | Poor | Poor | Acceptable | Acceptable | Poor |

Hence, it can be concluded that esters of glycerides are suitable emulsifiers. In particular acetic acid esters of glycerides, lactic acid esters of glycerides, diacetyl tartaric acid esters of glycerides, sorbitan monolaurate and sorbitan tristearate is suitable, since they are catergorised as "preferred" or "acceptable".

Example 5: Analysing Different Vegetable Waxes

An example was made to analyse different types of vegetable wax.

For all samples, 90% by weight beeswax and 5% acetic acid ester of monoglycerides, GRINDSTED® Acetem 70-00 P was used as well as 5% vegetable wax. The type of vegetable wax varied.

Candelilla wax from Norevo

Rice Bran wax from H&R Wax & Specialties

Coconut wax from Cargill

Carnauba wax from Ter Hel & Co. GmbH

Sugar cane wax from Deurex

Palm wax from Cargill

Soy wax from Cargill

TABLE 7

| Type of vegetable wax | Acceptance level |
|---|---|
| Candelilla wax | Preferred |
| Rice bran wax | Poor |
| Coconut wax | Acceptable |
| Carnauba wax | Poor |
| Sugar cane wax | Not useful |
| Palm wax | Preferred |
| Soy wax | Acceptable |

The evaluation "Preferred", "Acceptable", Poor" and "Not useful" in table 7 is based on analysis on congealing point, penetration, flexibility, solidification time and coating effect.

Hence, it is shown from table 7 that Candelilla wax, Coconut wax, Palm wax and Soy wax is the most suitable vegetable waxes that can be used since the use of these waxes are categorized as "preferred" or "acceptable". However, Carnauba wax and Rice bran wax may also be used even though they are not as suitable as Candelilla wax, Coconut wax, Palm wax and Soy wax. Sugar cane wax are categorized as not useful.

Example 6: Comparative Analysis of Petroleum-Based Waxes

Comparative data are shown of petroleum-based coating compositions.

The petroleum-based (mineral based) waxes are also considered to be good coating materials for cheese. The coating compositions for cheese according to the present invention are comparative to those petroleums based coating compositions.

In table 8 below, the analyses of congealing point, penetration, viscosity, WVTR, OTR, tensile stength, flexibility, solidification time, and coating effect are shown of the following four petroleum-based waxes:

ProCera®Basic, Procudan A/S
ProCera®Special, Procudan A/S
ProCera®Colour, Procudan A/S
ProCera®Finish, Procudan A/S

TABLE 8

| | ProCera ® Basic | ProCera ® Special | ProCera ® Finish | ProCera ® Colour |
|---|---|---|---|---|
| Congelating point (° C.) | 51 | 60.8 | 58.0 | 62.8 |
| Penetration (dmm) | 67.6 | 63.2 | 48.0 | 50.0 |
| Viscosity (mPa · s) | 3.9 | 5.9 | 4.6 | 6.1 |
| WVTR (g · mm/m$^2$ · day) | 17.7 | 9.4 | 13.2 | 13.2 |
| OTR (ml/m$^2$/day/atm) | 1472 | 1777 | 780 | 566 |
| Tensile strength (MPa) | 0.33 | 0.22 | 0.59 | 0.56 |
| Flexibility(Yes/No) | Yes | Yes | Yes | Yes |
| Solidification time (sec) | 2.7 | 1.9 | 2.1 | 2.5 |
| Coating effect (visual) | Good | Good | Good | Good |
| Overall acceptance | Preferred | Preferred | Preferred | Preferred |

The invention claimed is:

1. A cheese comprising a coating, wherein the coating on the cheese comprises:

a beeswax in an amount of 70% to 90% by weight, an emulsifier in an amount of 5% to 20% by weight, wherein the emulsifier is selected from the group consisting of acetic acid esters of glycerides, lactic acid esters of glycerides, diacetyl tartaric acid esters of glycerides and combinations thereof, and a vegetable wax in an amount of 5% to 25% by weight.

2. The cheese according to claim 1, wherein the amount of beeswax in the coating is 80 to 90% by weight.

3. The cheese according to claim 1, wherein the vegetable wax is one or more selected from the group consisting of Candelilla wax, Carnauba wax, Rice bran wax, Coconut wax, Palm-based wax, Soy-based wax and Rapeseed-based wax.

4. The cheese according to claim 1, wherein the weight ratio of the vegetable wax to the emulsifier is 1:4 to 5:1.

5. A cheese comprising a coating, wherein the coating on the cheese comprises:

a beeswax in an amount of 85% to 90% by weight, and an emulsifier in an amount of 10% to 15% by weight, wherein the emulsifier is selected from the group consisting of acetic acid esters of glycerides, lactic acid esters of glycerides, diacyl tartaric acid esters of glycerides and combinations thereof.

6. The cheese according to claim 5, wherein the coating further comprises vegetable wax in an amount of 0 to 5% by weight.

7. The cheese according to claim 6, wherein the vegetable wax is one or more selected from the group consisting of Candelilla wax, Coconut wax, Palm-based wax, Soy-based wax and Rapeseed-based wax.

* * * * *